United States Patent [19]

Suzuki

[11] 4,269,818

[45] May 26, 1981

[54] METHOD OF PRODUCING HYDROGEN

[76] Inventor: Masahiro Suzuki, 423, Yasaka, Kakegawa, Shizuoka, Japan

[21] Appl. No.: 93,660

[22] Filed: Nov. 13, 1979

[30] Foreign Application Priority Data

Nov. 13, 1978 [JP] Japan ............................. 53-139632

[51] Int. Cl.³ ............................................. C01B 1/07
[52] U.S. Cl. ................................... 423/657; 423/636
[58] Field of Search ............................. 423/657, 636; 427/336–338; 204/45 R, 48, 49, 51; 148/6.14, 6.27

[56] References Cited

U.S. PATENT DOCUMENTS

| | | | |
|---|---|---|---|
| 2,728,720 | 12/1955 | Delong | 148/6.27 X |
| 2,827,398 | 3/1958 | Eisenberg | 427/437 |
| 3,211,578 | 10/1965 | Gutzeit | 427/438 X |
| 4,072,514 | 2/1978 | Suzuki | 423/657 X |
| 4,137,368 | 1/1979 | Miller | 427/437 |

FOREIGN PATENT DOCUMENTS 2508450 9/1975 Fed. Rep. of Germany ........... 423/657

*Primary Examiner*—Edward J. Meros
*Attorney, Agent, or Firm*—Blanchard, Flynn, Thiel, Boutell & Tanis

[57] ABSTRACT

Hydrogen is produced by immersing a piece of magnesium in an electrolytic solution containing, for example, nickel, chromium, manganese, iron or platinum and then by immersing the magnesium piece in a neutral salt solution containing, for example, NaCl or KCl, or in sea water. Furthermore, hydrogen is produced by keeping a magnesium piece in contact with a metal, such as iron in the neutral salt solution for a certain period of time and then by replacing the magnesium piece in another neutral salt solution. In the latter method, the generation of hydrogen can be accelerated by connecting the magnesium piece and the metal to a direct-current supply in the range of 5 V to 200 V for a short time before the magnesium piece is immersed in the second neutral salt solution.

4 Claims, No Drawings

METHOD OF PRODUCING HYDROGEN

BACKGROUND OF THE INVENTION

The present invention relates to a method of producing hydrogen and more particularly to a method of producing hydrogen by a simple process that can be readily employed for practical use, without causing any pollution of the atmosphere and in a high yield with an extremely high purity.

In recent years, hydrogen has attracted attention as a potential fuel. On combustion, hydrogen does not produce substances which are liable to pollute the atmosphere such as, for example, sulfur oxides and nitrogen oxides. It is safe unless it is handled carelessly, and it possesses outstanding properties as a fuel.

For production of hydrogen, there have heretofore been developed methods involving operations on a large commercial scale such as, the method resorting to the electrolysis of water, the method relying upon the modification of petroleum gas and coal gas, and the method utilizing the secondary production of hydrogen attendant upon the electrolysis of alkalis.

All these operations inevitably require use of facilities of large dimensions and are apt to produce air pollution substances.

As a further method of producing hydrogen, the reaction between magnesium and water is known. This reaction is illustrated by the following chemical equation:

$$Mg + H_2O \rightarrow Mg(OH)_2 + H_2$$

In this reaction, once magnesium hydroxide is formed on the surface of magnesium, the formed magnesium hydroxide prevents a further contact of magnesium with water, so that the reaction is stopped and therefore the generation of hydrogen is also stopped.

With respect to this reaction, as disclosed in British Patent No. 579,246, it is known that if magnesium for use in the reaction of the foregoing chemical equation is prepared in the form of a mixture or alloy with such metal as iron, nickel or copper, the reaction velocity in the direction of the right member of the equation is accelerated and the quantity of hydrogen generated is proportionately increased.

However, it is not always easy to prepare magnesium for use in the reaction in the form of a mixture or alloy with, for example, iron, nickel or copper.

SUMMARY OF THE INVENTION

It is therefore a primary object of the present invention to provide a method of producing hydrogen by a simple process without causing any pollution of the atmosphere and in a high yield with a high purity.

Another object of the present invention is to produce hydrogen without requiring use of facilities of large dimensions.

In the present invention, hydrogen is produced by immersing a piece of magnesium in an electrolytic solution containing, for example, nickel, chromium, manganese, iron or platinum and then by immersing the magnesium piece in a neutral salt solution or sea water. Furthermore, in the present invention, hydrogen is produced by keeping the magnesium piece in contact with a metal, such as nickel, platinum or iron in a neutral salt solution for a certain period of time and then by replacing the magnesium piece in another neutral salt solution. In the latter method, the generation of hydrogen can be accelerated by connecting the magnesium piece and the metal to a direct-current supply before immersing the magnesium piece in the second neutral salt solution.

DETAILED DESCRIPTION OF THE PREFERRED EMBODIMENTS

Generally, the present invention is based on decomposition of water in accordance with the reaction as illustrated below:

$$Mg + H_2O \rightarrow Mg(OH)_2 + H_2$$

This reaction, however, stops once magnesium hydroxide is formed on the surface of magnesium, so that in practice, the amount of hydrogen generated by this reaction is extremely small. In the present invention, magnesium in the form of ribbon, plate or particles, is immersed in an electrolytic solution containing, for example, nickel, chromium, manganese, iron or platinum. By the immersion of magnesium in the electrolytic solution, the surface of magnesium is activated electrochemically and when the thus treated magnesium is immersed in a neutral salt aqueous solution, such as aqueous solutions of NaCl, KCl, $Na_2SO_4$ or $K_2SO_4$ or sea water, hydrogen is generated vigorously in continuation. A significant feature of this activation is that, once magnesium is activated in the above-mentioned manner, the magnesium is no longer deactivated.

In another method of activating magnesium in the present invention, magnesium is placed in contact with, for example, an iron plate or iron saucer, in the previously mentioned neutral salt aqueous solution. When a magnesium piece is immersed in the neutral salt aqueous solution in contact with, for example, the iron plate, the magnesium piece is activated, with its surface turning blackish in color with time. When the surface of the magnesium is turned blackish, the magnesium is most activated.

This activation can be accelerated by connecting the magnesium piece and the iron plate to a direct-current supply in the range of 5 V to 200 V for a short time.

When the thus activated magnesium is then immersed in the neutral salt aqueous solution or sea water, hydrogen is generated vigorously.

The present invention will be described more specifically by referring to preferred embodiments and comparative examples. The following examples should be interpreted as illustrative and not in a limiting sense.

EXAMPLE 1

A ribbon of magnesium measuring 3.2 mm in width and weighing 1.2 g was immersed in 200 ml of a nickel electrolytic solution (nickel nonelectrode plating liquid for stainless steel made by Pack Co., Ltd.) for 10 seconds, so that nickel in the nickel electrolytic solution was deposited on the surface of the magnesium ribbon. The magnesium ribbon was taken out of the nickel electrolytic solution and was then placed in 1,000 ml of NaCl aqueous solution containing about 50 g of NaCl. The magnesium was changed to magnesium hydroxide, and hydrogen was vigorously generated. The relation between the cumulative volume of hydrogen generated and the length of time of the ribbon's immersion in the NaCl aqueous solution is shown below:

| Time (min.) | 10 | 30 | 40 | 60 | 80 |
|---|---|---|---|---|---|
| Cumulative volume (ml) of hydrogen | 82 | 642 | 1,080 | 1,144 | 1,168 |

EXAMPLE 2

A ribbon of magnesium measuring 3.2 mm in width and weighing 1.0 g was immersed in 200 ml of the nickel electrolytic solution as employed in Example 1 for 40 seconds, so that nickel in the nickel electrolytic solution was deposited on the surface of the magnesium ribbon. When the magnesium ribbon was taken out of the nickel electrolytic solution and then placed in 1,000 ml of sea water, hydrogen was generated as follows:

| Time (min.) | 10 | 30 | 40 | 50 | 60 | 80 |
|---|---|---|---|---|---|---|
| Cumulative volume (ml) of hydrogen | 82 | 621 | 840 | 921 | 952 | 965 |

EXAMPLE 3

A ribbon of magnesium measuring 3.2 mm in width and weighing 1.6 g was immersed in 200 ml of the same nickel electrolytic solution as employed in Example 1 for 10 seconds so that nickel was deposited on the surface of the magnesium ribbon. When the thus treated magnesium was placed in city water, hydrogen was generated, but its generation was terminated in 10 minutes.

EXAMPLE 4

A magnesium plate measuring 1.1 g in weight was immersed in 1,000 ml of 1 mole ferric chloride aqueous solution for 10 seconds. When the magnesium plate was placed in 1,000 ml of NaCl aqueous solution containing about 50 g of NaCl, hydrogen was generated as follows:

| Time (min.) | 10 | 30 | 50 | 60 | 80 |
|---|---|---|---|---|---|
| Cumulative volume (ml) of hydrogen | 120 | 875 | 1,095 | 1,110 | 1,141 |

In Example 4, ferrous chloride, nickel chloride, nickel sulfate, chromium chloride and manganese chloride were respectively employed instead of ferric chloride. The results showed that almost the same amount of hydrogen as in the case of ferric chloride was generated. Furthermore, in Example 4, instead of NaCl aqueous solution, $Na_2SO_4$ aqueous solution was employed. The amount of hydrogen generated was also almost the same as in the case of Example 4.

EXAMPLE 5

13.0 g of 0.5 N $H_2PtCl_6$ aqueous solution was diluted with water to 100 ml of $H_2PtCl_6$ aqueous solution. 1.6 g of magnesium particles was immersed in the above-mentioned $H_2PtCl_6$ aqueous solution for 5 seconds and then placed in 1,000 ml of sea water. Hydrogen was generated as follows:

| Time (min.) | 10 | 30 | 50 | 60 | 80 |
|---|---|---|---|---|---|
| Cumulative volume (ml) of hydrogen | 95 | 685 | 1,150 | 1,160 | 1,168 |

In Example 5, when a magnesium plate was employed instead of magnesium particles, almost the same amount of hydrogen as in Example 5 was generated.

Furthermore, in Example 5, when 1,000 ml of KCl aqueous solution containing about 60 g of KCl was employed instead of sea water, the result was almost the same as in Example 5 with respect to the generation of hydrogen.

EXAMPLE 6

In a 1.5 l container containing 1,000 ml of NaCl aqueous solution containing 50 g of NaCl was placed an iron saucer in such a manner that the iron saucer was completely immersed in the NaCl aqueous solution. In the iron source, a magnesium plate measuring 1.2 g in weight was placed in such a manner that the magnesium plate was in contact with the bottom of the iron saucer and, at the same time, the magnesium plate was also immersed completely in the NaCl aqueous solution. When the surface of the magnesium plate was turned blackish in color, the magnesium plate was taken out of the container and was then placed in another container containing 1,000 ml of NaCl aqueous solution containing 50 g of NaCl. In this case, hydrogen was generated as follows:

| Time (min.) | 20 | 30 | 40 | 50 | 60 | 80 | 100 | 120 | 140 |
|---|---|---|---|---|---|---|---|---|---|
| Cumulative volume (ml) of hydrogen | 10 | 32 | 104 | 246 | 430 | 712 | 864 | 916 | 942 |

In Example 6, the same NaCl aqueous solution can be employed without replacing the magnesium plate into another container. Further, in Example 6, when magnesium plate was placed in 1,000 ml of sea water, almost the same amount of hydrogen as in Example 6 was generated.

EXAMPLE 7

In a 1.5 l container containing 1,000 ml of sea water were placed a ribbon of magnesium measuring 1.2 g in weight and an iron piece measuring 10 g in weight. The magnesium plate and the iron piece were connected to a direct-current supply of 12 V for 120 seconds. When the magnesium plate was taken from the sea water and was immersed in 1,000 ml of KCl aqueous solution containing about 60 g of KCl, hydrogen was generated as follows:

| Time | 10 | 20 | 30 | 40 | 50 | 60 | 70 | 80 |
|---|---|---|---|---|---|---|---|---|
| Cumulative volume (ml) of hydrogen | 128 | 440 | 786 | 1,006 | 1,086 | 1,104 | 1,126 | 1,136 |

In Example 7, NaCl, $Na_2SO_4$ and $K_2SO_4$ were employed instead of KCl, respectively. The results showed that almost the same amount of hydrogen as in Example 7 was respectively produced.

In comparison with Example 6, it was observed that, in Example 7, the magnesium plate was found to be turned black in color more readily.

EXAMPLE 8

For comparison with the above-mentioned Examples 1 through 7, a magnesium plate measuring 3.2 mm in width and 1.1 g in weight was immersed in 1,000 ml of sea water. However, no hydrogen was generated.

EXAMPLE 9

For the same purpose as in Example 8, a magnesium plate measuring 3.2 mm in width and 1.0 g in weight was immersed in 1,000 ml of city water. No hydrogen was generated, either.

The hydrogen generated according to the present invention has a purity exceeding 99.999%.

What is claimed is:

1. A method for producing hydrogen by the reaction between magnesium and water, which comprises the steps of:

immersing magnesium in an aqueous electrolytic solution containing at least one compound of at least one metal selected from the group consisting of nickel, chromium, manganese, iron and platinum, for a short period of time and without applying an external electroplating current, whereby to deposit said metal on the surface of said magnesium and thereby activate said surface so that said magnesium will rapidly react with water over an extended period of time to generate a large volume of hydrogen; and then immersing the activated magnesium in sea water or an aqueous solution of a salt selected from the group consisting of NaCl, KCl, $Na_2SO_4$ and $K_2SO_4$ and thereby generating hydrogen.

2. A method as claimed in claim 1 in which said aqueous electrolytic solution consists essentially of an aqueous solution of ferric chloride.

3. A method as claimed in claim 1 in which said aqueous electrolytic solution consists essentially of an aqueous solution of $H_2PtCl_6$.

4. A method as claimed in claim 1 in which said magnesium is immersed in said aqueous electrolytic solution for from about 5 seconds to about 40 seconds.

* * * * *